(12) United States Patent
Crossley et al.

(10) Patent No.: US 9,440,564 B2
(45) Date of Patent: Sep. 13, 2016

(54) LOCKING DEVICE FOR A VEHICLE SEAT, AND VEHICLE SEAT

(71) Applicant: Johnson Controls GmbH, Burscheid (DE)

(72) Inventors: Mark Crossley, Chelmsford Essex (GB); Ramakant K. Gowli, Pune (IN); Ashish D. Mulay, Leverkusen (DE); Prasanth M. Pushparajan, Burscheid (DE); Raminder Singh, Leverkusen (DE); Vinay K. Sudke, Pune (IN); Halil Uezek, Wuppertal (DE); Vikas Wayal, Pune (IN)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 14/418,668

(22) PCT Filed: Jul. 25, 2013

(86) PCT No.: PCT/EP2013/065723
§ 371 (c)(1),
(2) Date: Jan. 30, 2015

(87) PCT Pub. No.: WO2014/019932
PCT Pub. Date: Feb. 6, 2014

(65) Prior Publication Data
US 2015/0203002 A1   Jul. 23, 2015

(30) Foreign Application Priority Data

Jul. 31, 2012 (DE) .................. 10 2012 015 236
Oct. 17, 2012 (DE) .................. 10 2012 020 269

(51) Int. Cl.
*A47C 7/62* (2006.01)
*B60N 2/44* (2006.01)
(Continued)

(52) U.S. Cl.
CPC ............. *B60N 2/44* (2013.01); *B60N 2/01583* (2013.01); *B60N 2/305* (2013.01); *B60N 2/3011* (2013.01);
(Continued)

(58) Field of Classification Search
CPC .. B60N 2/44; B60N 2/01583; B60N 2/3011; B60N 2/305; B60N 2/366; B60N 2/442; B60N 2002/4455; B60N 2002/4485
USPC .................... 297/216.1, 216.19, 452.18, 336
See application file for complete search history.

(56) References Cited

U.S. PATENT DOCUMENTS 5,547,242 A  *  8/1996  Dukatz .............. B60N 2/01583
                                                     116/283
6,213,525 B1 * 4/2001  Nicola ............... B60N 2/01583
                                                     248/503.1
(Continued)

FOREIGN PATENT DOCUMENTS

DE          103 41 624 A1    4/2005
DE     10 2004 053 811 A1    6/2005
(Continued)

*Primary Examiner* — Jose V Chen
(74) *Attorney, Agent, or Firm* — McGlew and Tuttle, P.C.

(57) ABSTRACT

A locking device (10), for a vehicle seat (1), includes an indicating device (8) for indicating the locking state of the locking device (10). The indicating device (8) has a locking indicator (31, 32), which is visible when the locking device (10) is locked, and a release indicator (33, 34), which is visible when the locking device (10) is released. The indicating device (8) has at least one indicator arm (30), which is in the locking position when the locking device (10) is locked and which is in the release position when the locking device (10) is released. The indicator arm (30) includes an indicating area (39), which has a first locking indicator (31) and a first release indicator (33). A second release indicator (34), which is concealed by the indicator arm (30) when the indicator arm is in the locking position, is provided on a retaining plate (20).

21 Claims, 4 Drawing Sheets

(51) Int. Cl.
    *B60N 2/015*     (2006.01)
    *B60N 2/30*     (2006.01)
    *B60N 2/36*     (2006.01)

(52) U.S. Cl.
    CPC .............. *B60N 2/366* (2013.01); *B60N 2/442* (2013.01); *B60N 2002/4455* (2013.01); *B60N 2002/4485* (2013.01)

(56) References Cited

U.S. PATENT DOCUMENTS

| | | | | |
|---|---|---|---|---|
| 8,684,464 | B2* | 4/2014 | Muller | B60N 2/01583 297/216.1 |
| 2005/0067852 | A1 | 3/2005 | Jeong | |
| 2005/0077770 | A1* | 4/2005 | Lang | B60N 2/36 297/331 |
| 2005/0212338 | A1* | 9/2005 | Muller | B60N 2/01583 297/336 |
| 2005/0247846 | A1* | 11/2005 | Jeong | B60N 2/0868 248/429 |
| 2006/0108847 | A1* | 5/2006 | O'Callaghan | B60N 2/01583 297/344.1 |
| 2011/0140485 | A1* | 6/2011 | Macmanus | B60N 2/06 297/216.1 |
| 2011/0221246 | A1* | 9/2011 | Downie | B60N 2/1842 297/216.1 |
| 2011/0227377 | A1* | 9/2011 | Swierczewski | B60N 2/1615 297/216.15 |
| 2012/0212015 | A1* | 8/2012 | Ozawa | B60N 2/165 297/216.1 |
| 2013/0221726 | A1* | 8/2013 | Kalinowski | B60N 2/01591 297/463.1 |
| 2013/0300164 | A1* | 11/2013 | Jonsson | B60N 2/42727 297/216.1 |
| 2013/0320736 | A1* | 12/2013 | Teufel | B60N 2/2356 297/383 |
| 2014/0117698 | A1* | 5/2014 | Seto | B60N 2/01583 296/65.03 |
| 2014/0169873 | A1* | 6/2014 | Kamata | B60N 2/01583 403/384 |
| 2015/0048660 | A1* | 2/2015 | Hou | B60N 2/2821 297/256.16 |
| 2015/0203002 | A1* | 7/2015 | Crossley | B60N 2/01583 297/217.1 |
| 2015/0352986 | A1* | 12/2015 | Fujita | B60N 2/26 297/216.1 |

FOREIGN PATENT DOCUMENTS

| | | |
|---|---|---|
| DE | 10 2004 060 565 A1 | 11/2005 |
| FR | 2 782 483 A1 | 2/2000 |
| JP | H10 081161 A | 3/1998 |
| WO | 2004/069585 A1 | 8/2004 |

\* cited by examiner

LOCKING DEVICE FOR A VEHICLE SEAT, AND VEHICLE SEAT

CROSS REFERENCE TO RELATED APPLICATIONS

This application is a United States National Phase Application of International Application PCT/EP2013/065723 filed Jul. 25, 2013 and claims the benefit of priority under 35 U.S.C. §119 of German Patent Applications DE 10 2012 015 236.1 filed Jul. 31, 2012 and DE 10 2012 020 269.5 filed Oct. 17, 2012, the entire contents of which are incorporated herein by reference.

FIELD OF THE INVENTION

The present invention relates to a locking device for a vehicle seat having a display device for indicating a locking state, wherein the display device has at least one locking indicator which is visible when the locking device is locked, and at least one unlocking indicator, which is visible when the locking device is unlocked. The invention also relates to a vehicle seat having the locking device.

BACKGROUND OF THE INVENTION

A locking device of the generic type is known from WO 2004/069 585 A2. In order to unlock the locking device, there is provided an unlocking bolt which is constructed integrally with a securing element of the locking device. By pivoting the unlocking bolt about a bearing pin which acts as a pivot axis, the locking device can be unlocked.

For a user of the vehicle seat, it is extremely important that all the locking devices of the vehicle seat are fully locked. Otherwise, the vehicle seat can become disengaged from the vehicle structure in the event of a crash, which may lead to injuries to the user. An indication of the locking state of the locking device is therefore helpful for the user.

The locking state of the locking device can be identified from the angular position of the unlocking bolt. The unlocking bolt thus indicates whether the locking device is locked or unlocked.

However, the unlocking bolt is relatively small compared with the locking device and the vehicle seat. Furthermore, the unlocking bolts of the individual locking devices are arranged below the seat member of the vehicle seat at locations which are relatively difficult to see. Consequently, the locking state of the locking devices is relatively difficult to visually identify. In particular, it is difficult to perceive the locking state of a plurality of locking devices of a vehicle seat at the same time.

DE 10 2004 060 565 A1 discloses a locking device which has a locking indicator and an unlocking indicator for indicating the locking state of the locking device.

DE 10 2004 060 565 A1 also discloses a locking device which has a locking indicator and an unlocking indicator for indicating the locking state of the locking device.

SUMMARY OF THE INVENTION

An object of the invention is to improve a locking device for a vehicle seat of the type mentioned in the introduction, in particular, to increase the visibility of the indicator of the locking state of the locking device.

A locking device of the generic type for a vehicle seat comprises a display device for indicating the locking state of the locking device, wherein the display device has at least one locking indicator which is visible when the locking device is locked, and at least one unlocking indicator, which is visible when the locking device is unlocked. The display device has at least one indicator arm which is located in a locking position when the locking device is locked and which is located in an unlocking position when the locking device is unlocked. The indicator arm comprises a display region which has a first locking indicator and a first unlocking indicator.

According to the invention, there is provided on a metal retention sheet a second unlocking indicator which is covered by the indicator arm which is located in the locking position.

Both the locked locking state of the locking device and the unlocked locking state of the locking device can thereby be explicitly visually perceived in each case. The unlocked locking state of the locking device can be perceived at two different locations, that is to say, on the first unlocking indicator and on the second unlocking indicator.

In particular with the corresponding color identification, preferably by the at least one locking indicator being constructed as a surface which is provided with a green color, and/or by the at least one unlocking indicator being constructed as a surface which is provided with a red color, the visibility of the indication of the locking state of the locking device is advantageously increased.

Advantageously, the at least one locking indicator is covered when the locking device is unlocked.

The at least one unlocking indicator is also advantageously covered when the locking device is locked.

Preferably, the indicator arm is supported so as to be able to pivot from the locking position into the unlocking position thereof.

According to another advantageous embodiment of the invention, there is provided on the metal retention sheet a second locking indicator which is covered by the indicator arm which is located in the unlocking position.

Preferably, the second locking indicator and the second unlocking indicator are arranged at opposing sides of the metal retention sheet.

Advantageously, the first locking indicator is covered in this instance by the metal retention sheet when the indicator arm is located in the unlocking position.

Additionally or alternatively, the first unlocking indicator is also advantageously covered by the metal retention sheet when the indicator arm is located in the locking position.

Preferably, the first locking indicator and the first unlocking indicator are arranged at opposing sides of the display region.

According to an advantageous development of the invention, there is formed in the metal retention sheet a through-opening with which the display region is in alignment.

When the indicator arm is located in the locking position, it is located outside the through-opening.

When the indicator arm is located in the unlocking position, it protrudes through the through-opening.

In order to unlock the locking device, there is advantageously provided an unlocking lever which is coupled to the indicator arm so as to be carried therewith.

Preferably, the indicator arm and the unlocking lever can be pivoted about axes which extend in a parallel manner.

The object is also achieved by a vehicle seat which comprises at least one locking device according to the invention.

The present invention shall be explained in more detail on the basis of the following figures and exemplary embodiments, without the present invention being limited to these.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
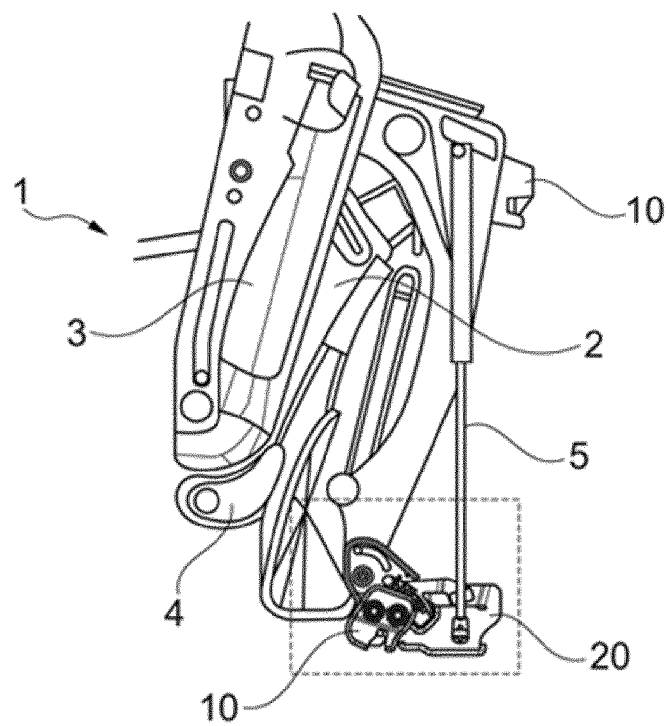
FIG. 1 is a longitudinal sectional view through a vehicle seat in the tumble position.

A vehicle seat 1 for a motor vehicle has a seat member 2 and a backrest 3 which is fitted thereto and which can be folded relative to the seat member 2. A headrest 4 is arranged at the end of the backrest 3 facing away from the seat member 2.

The arrangement of the vehicle seat 1 inside the vehicle and the conventional travel direction thereof define the directional indications used below. In this instance, a direction which is orientated perpendicularly relative to the ground is referred to below as the vertical direction and a direction perpendicular relative to the vertical direction and perpendicular relative to the travel direction is referred to below as the transverse direction.

The vehicle seat 1 can be secured to the vehicle structure by means of a plurality of locking devices 10. In this instance, two locking devices 10 are provided in a rear region of the vehicle seat 1 in the travel direction, one of these locking devices 10 being arranged at the right-hand side in the travel direction and the other of these locking devices 10 being arranged at the left-hand side in the travel direction. Two additional locking devices 10 are provided in a front region of the vehicle seat 1 in the travel direction, one of these locking devices 10 being arranged at the right-hand side in the travel direction and the other of these locking devices 10 being arranged at the left-hand side in the travel direction.

Figure 2:
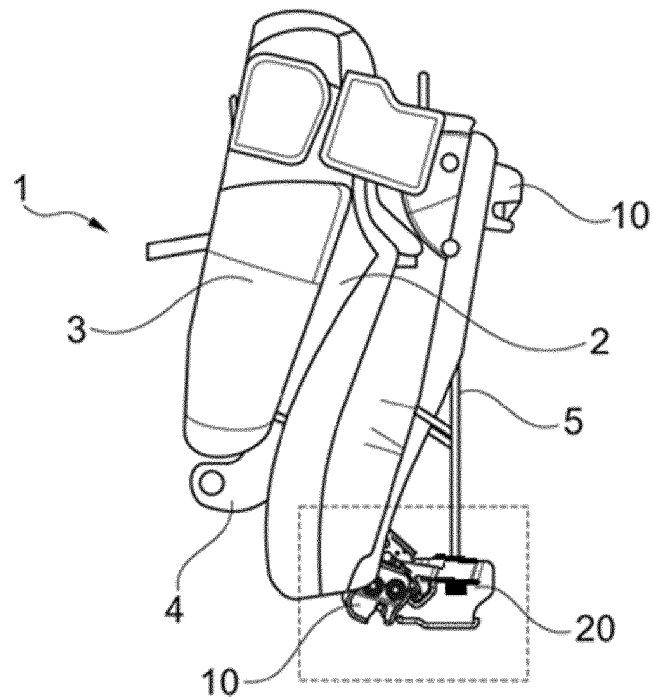
FIG. 2 is a side view of the vehicle seat from FIG. 1 in the tumble position.

The vehicle seat 1 described in this instance is a seat in a second seat row of a vehicle. FIG. 1 is a section through the vehicle seat 1 perpendicularly relative to the transverse direction, the locking devices 10 which are arranged at the right-hand side in the travel direction being visible. FIG. 2 is a side view of the vehicle seat 1, the locking devices 10 which are arranged on the left in the travel direction being visible.

Figure 3:
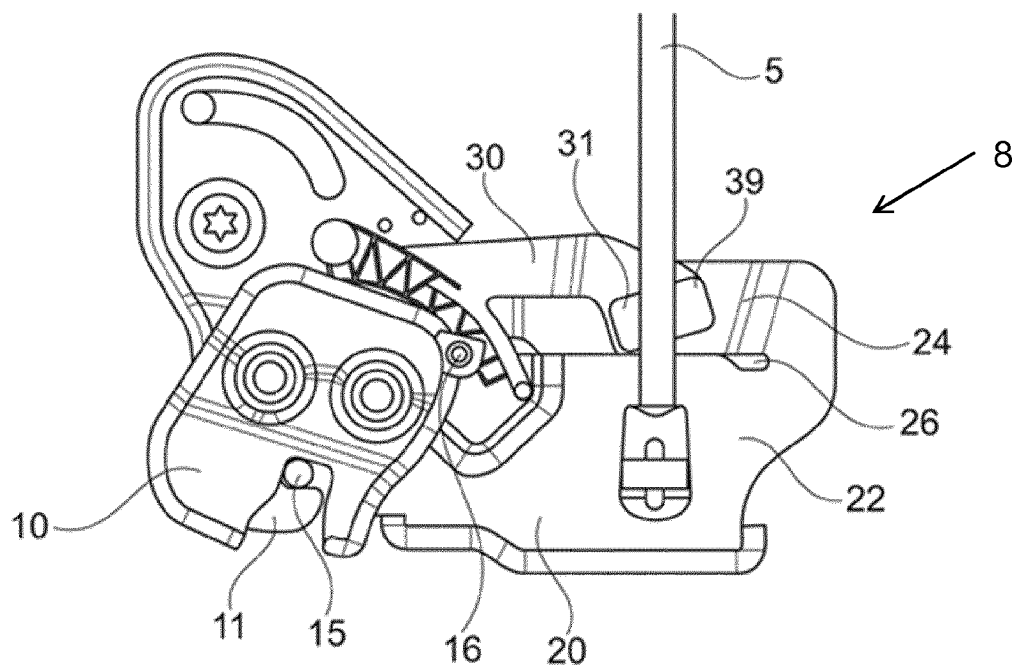
FIG. 3 is an enlarged illustration of the surrounded region of FIG. 1 with the locking device locked.
Figure 4:
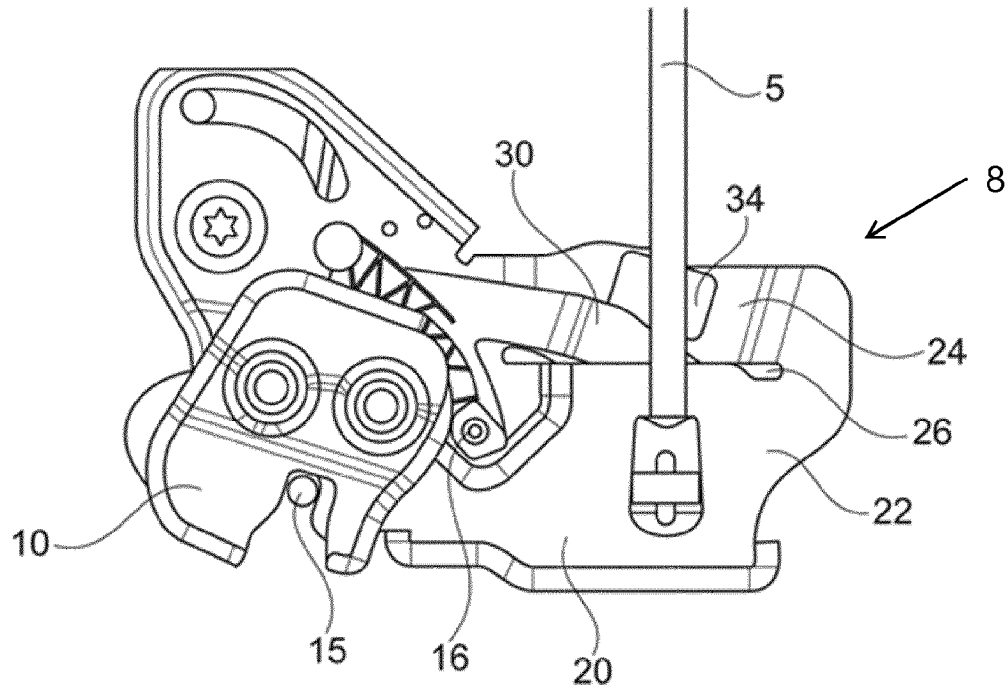
FIG. 4 is an enlarged illustration of the surrounded region of FIG. 1 with the locking device unlocked.
Figure 5:
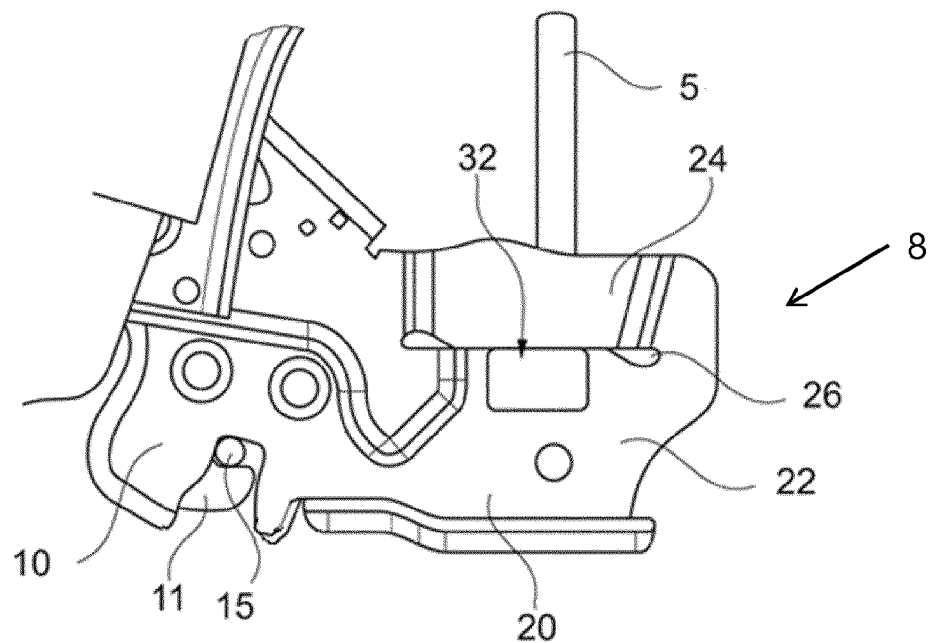
FIG. 5 is an enlarged illustration of the surrounded region of FIG. 2 with the locking device locked.
Figure 6:
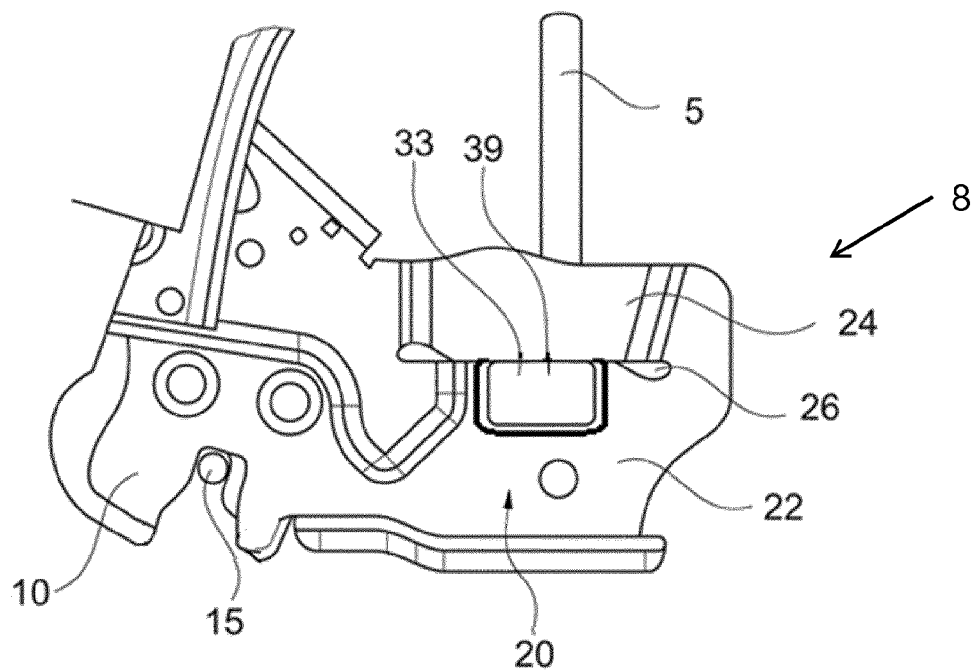
FIG. 6 is an enlarged illustration of the surrounded region of FIG. 2 with the locking device unlocked.
Figure 7:
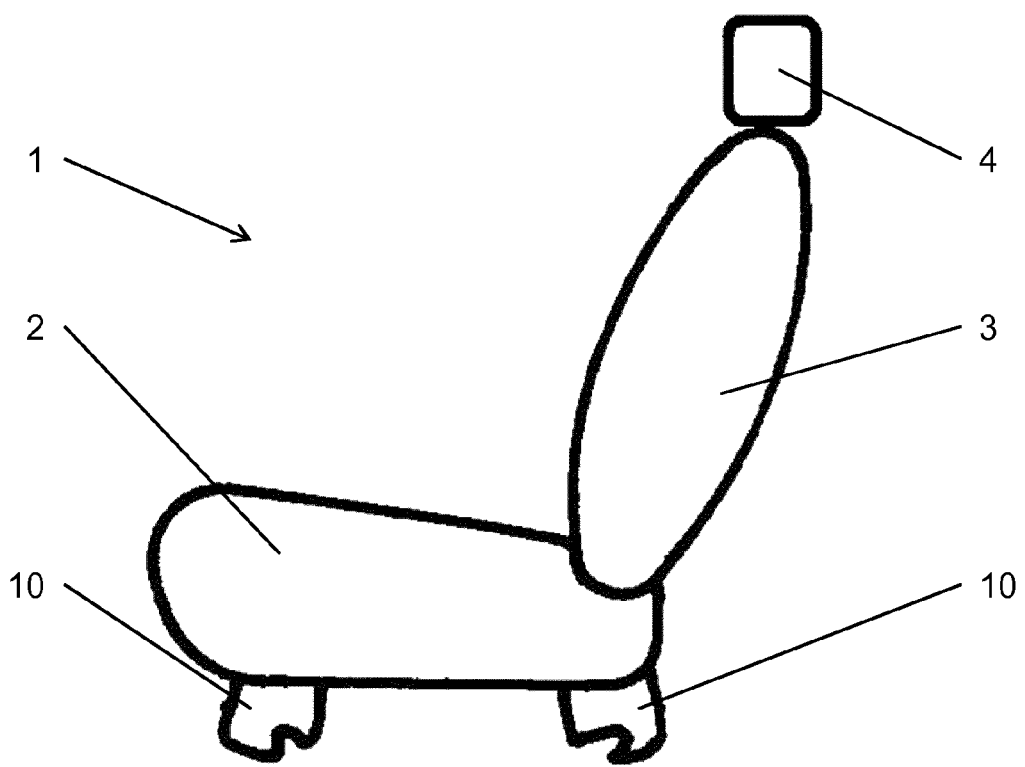
FIG. 7 is a schematic illustration of a vehicle seat.

FIG. 3 and FIG. 4 illustrate the locking device 10 which is arranged in the front region of the vehicle seat 1 on the right in the travel direction, and FIG. 5 and FIG. 6 illustrate the locking device 10 which is arranged in the front region of the vehicle seat 1 on the left in the travel direction. In all the illustrations shown in this instance, the viewing direction is the same, that is to say, in each case in the transverse direction, to the right in relation to the travel direction.

In the locked state, a detent 11 of the locking device 10 engages around a pin 15 which is arranged on the vehicle structure. In the unlocked state of the locking device 10, the detent 11 is pivoted away about an axis which extends in the transverse direction and releases the pin 15. For unlocking, an unlocking lever 16 which is secured to a securing element which is not illustrated is pivoted about an axis which extends in the transverse direction, whereby the securing element releases the detent 11. Such a locking device 10 is described, for example, in WO 2004/069 585 A2, the disclosure content of which in this regard is explicitly incorporated herein by reference.

Based on a conventional travel position, the backrest 3 can be folded onto the seat member 2. By subsequently unlocking the rear locking devices 10, the rear region of the vehicle seat 1 can be pivoted upward and moved into a tumble position, as illustrated in FIG. 1 and FIG. 2. A gas compression spring 5 retains the vehicle seat 1 in the tumble position.

By unlocking the two front locking devices 10, which will be set out in greater detail below, in the tumble position the vehicle seat 1 can be released from the vehicle structure and removed from the vehicle.

The two front locking devices 10 are in this instance constructed in a mirror-symmetrical manner with respect to a plane which extends perpendicularly relative to the transverse direction. It is also conceivable to construct the two rear locking devices 10 in the same manner as the two front locking devices 10.

The two front locking devices 10 each have a display device 8, which indicates the locking state of the respective locking device 10. The display device 8 consequently indicates whether the respective locking device 10 is locked or unlocked.

Each of the front locking devices 10 is secured to the vehicle seat 1 by means of a metal retention sheet 20. An end of the gas compression spring 5 is also fitted to the metal retention sheet 20. The metal retention sheet 20 extends primarily in the longitudinal direction and the vertical direction.

The metal retention sheet 20 comprises a retention region 22 which is located at the bottom in the vertical direction and to which the gas compression spring 5 is secured, and a functional region 24 which is located at the top in the vertical direction and which is offset relative to the retention region 22 in the transverse direction. A through-opening 26 is consequently formed between the functional region 24 and the retention region 22 when viewed in the vertical direction.

The display device 8 has an indicator arm 30 which is supported on the metal retention sheet 20 so as to be able to be pivoted about an axis which extends in a transverse direction. The axis about which the detent 11 can be pivoted, the axis about which the unlocking lever 16 can be pivoted and the axis about which the indicator arm 30 can be pivoted consequently extend parallel with each other in the transverse direction.

The indicator arm 30 and the unlocking lever 16 are coupled so as to be carried with each other, in this instance by means of a tenon and slot guide. At the end of the indicator arm 30 remote from the rotation axis thereof, there is provided a display region 39 which is in alignment with the through-opening 26 of the metal retention sheet 20 when viewed in the transverse direction.

When the locking device 10 is locked, as illustrated in FIG. 3 and FIG. 5, the indicator arm 30 is located in the locking position, the display region 39 being located in a vertical direction substantially at the same height as the functional region 24 of the metal retention sheet 20 and above the through-opening 26. The indicator arm 30 which is located in the locking position is consequently located outside the through-opening 26.

When the locking device 10 is unlocked, as illustrated in FIG. 4 and FIG. 6, the indicator arm 30 is in the unlocking position, the display region 39 being introduced into the through-opening 26 and being located in a vertical direction below the functional region 24 and substantially at the same height as the retention region 22 of the metal retention sheet 20. The indicator arm 30 located in the unlocking position consequently extends through the through-opening 26.

At the side facing inward in the transverse direction, that is to say, directed toward the center of the vehicle seat, the display region 39 has a first locking indicator 31 which can be seen in FIG. 3. At the side facing outward in the transverse direction, that is to say, directed away from the center of the vehicle seat, the display region 39 has a first unlocking indicator 33 which can be seen in FIG. 6.

At the side facing inward in the transverse direction, the functional region 24 has a second unlocking indicator 34, which can be seen in FIG. 4. At the side facing outward in the transverse direction, the retention region 22 has a second locking indicator 32 which can be seen in FIG. 5.

The locking indicators 31, 32 are constructed in this instance as surfaces which are provided with a green color and indicate that the vehicle seat 1 is secured to the vehicle structure. The unlocking indicators 33, 34 are constructed in this instance as surfaces which are provided with a red color and indicate that the vehicle seat 1 can be released from the vehicle structure.

When the locking device 10 is locked and the indicator arm 30 is in the locking position, the first locking indicator 31 when viewed in the transverse direction from the inner side can consequently be seen in the display region 39 of the indicator arm 30, as illustrated in FIG. 3, and, when viewed in the transverse direction from the outer side, the second locking indicator 32 can be seen in the retention region 22 of the metal retention sheet 20, as illustrated in FIG. 5. The second unlocking indicator 34 is in this instance covered by the display region 39 of the indicator arm 30 and the first unlocking indicator 33 is in this instance covered by the functional region 24 of the metal retention sheet 20.

When the locking device 10 is unlocked and the indicator arm 30 is in the unlocking position, the first unlocking indicator 33 when viewed in the transverse direction from the outer side can consequently be seen in the display region 39 of the indicator arm 30, as illustrated in FIG. 6 and, when viewed in the transverse direction from the inner side, the second unlocking indicator 34 in the functional region 24 of the metal retention sheet 20 can be seen, as illustrated in FIG. 4. The second locking indicator 32 is in this instance covered by the display region 39 of the indicator arm 30 and the first locking indicator 31 is in this instance covered by the retention region 22 of the metal retention sheet 20.

The features disclosed in the above description, the claims and the drawings may be significant both individually and in combination in order to implement the invention in the various configurations thereof.

While specific embodiments of the invention have been shown and described in detail to illustrate the application of the principles of the invention, it will be understood that the invention may be embodied otherwise without departing from such principles.

The invention claimed is:

1. A locking device for a vehicle seat, the locking device comprising a display device for indicating a locking state of the locking device, wherein the display device comprises:
   an indicator arm, which is located in a locking position when the locking device is locked and which is located in an unlocking position when the locking device is unlocked, wherein the indicator arm comprises a display region comprising a locking indicator, which is arranged to be visible from outside the seat when the locking device is locked and an first unlocking indicator, which is arranged to be visible from outside the seat when the locking device is unlocked; and
   a metal retention sheet with a second unlocking indicator, the second unlocking indicator being arranged on the retention sheet to be covered by the indicator arm with the indicator arm in the locking position.

2. The locking device as claimed in claim 1, wherein the locking indicator is arranged on the indicator arm to be covered when the locking device is unlocked.

3. The locking device as claimed in claim 1, wherein at least one of the first unlocking indicator is arranged on the indicator arm and the second unlocking indicator is arranged on the retention sheet, to be covered when the locking device is locked.

4. The locking device as claimed in claim 1, wherein the indicator arm is pivotally connected to the locking device to pivot from the locking position into the unlocking position thereof.

5. The locking device as claimed in claim 1, wherein:
   the locking indicator is a first locking indicator; and
   the metal retention sheet further is provided with a second locking indicator, which is arranged on the retention sheet to be covered by the indicator arm with the indicator arm in the unlocking position.

6. The locking device as claimed in claim 5, wherein the second locking indicator and the second unlocking indicator are arranged at opposing sides of the metal retention sheet.

7. The locking device as claimed in claim 1, wherein the locking indicator is arranged on the indicator arm to be covered by the metal retention sheet when the indicator arm is located in the unlocking position.

8. The locking device as claimed in claim 1, wherein the first unlocking indicator is arranged on the indicator arm to be covered by the metal retention sheet when the indicator arm is located in the locking position.

9. The locking device as claimed in claim 1, wherein the locking indicator and the first unlocking indicator are arranged at opposing sides of the display region.

10. The locking device as claimed in claim 1, wherein the metal retention sheet has a through-opening formed therein, the through-opening being aligned with the display region.

11. The locking device as claimed in claim 10, wherein the indicator arm, with the indicator arm located in the locking position, is located outside of the through-opening.

12. The locking device as claimed in claim 10, wherein the indicator arm with the indicator arm located in the unlocking position, protrudes through the through-opening.

13. The locking device as claimed in claim 1, further comprising an unlocking lever coupled to the indicator arm so as to be operatively connected, the unlocking lever for unlocking the locking device.

14. The locking device as claimed in claim 13, wherein the indicator arm and the unlocking lever pivot about respective axes which extend in a parallel manner.

15. A vehicle seat comprising:
a seat member;
a backrest connected to the seat member; and
a locking device comprising a display device for indicating a locking state of the locking device, wherein the display device comprises
an indicator arm, which is located in a locking position when the locking device is locked and which is located in an unlocking position when the locking device is unlocked, wherein the indicator arm comprises a display region comprising a locking indicator, which is visible when the locking device is locked and an first unlocking indicator, which is visible when the locking device is unlocked; and
a metal retention sheet with a second unlocking indicator, the second unlocking indicator being arranged on the retention sheet to be covered by the indicator arm with the indicator arm in the locking position;
the locking indicator being arranged on the indicator arm and relative to the retention sheet to be uncovered by the retention sheet and visible from outside the seat when the indicator arm is in the locking position, the first unlocking locking indicator being arranged on the indicator arm and relative to the retention sheet to be uncovered by the retention sheet and visible from outside the seat when the indicator arm is in the unlocking locking position.

16. The locking device as claimed in claim 15, wherein the locking indicator is arranged on the indicator arm to be covered and not visible from outside the seat when the locking device is unlocked.

17. The locking device as claimed in claim 15, wherein at least one of the first unlocking indicator is arranged on the indicator arm and the second unlocking indicator is arranged on the retention sheet, to be covered and not visible from outside the seat when the locking device is locked.

18. The locking device as claimed in claim 15, wherein the indicator arm is pivotally connected to the locking device to pivot from the locking position into the unlocking position thereof.

19. The locking device as claimed in claim 15, wherein:
the locking indicator is a first locking indicator; and
the metal retention sheet further is provided with a second locking indicator, which is arranged on the retention sheet to be covered by the indicator arm and not visible from outside the seat with the indicator arm in the unlocking position.

20. The locking device as claimed in claim 19, wherein the second locking indicator and the second unlocking indicator are arranged at opposing sides of the metal retention sheet.

21. A locking vehicle seat arrangement, the display device comprising:
a seat member;
a backrest connected to the seat member;
a locking device locking the vehicle seat;
a retention sheet;
an indicator arm movable relative to said retention sheet, said indicator arm being movable into a locking position when said locking device locks the vehicle seat, said indicator arm being movable into an unlocking position when said locking device unlocks the vehicle seat;
a locking indicator arranged on said indicator arm to be covered by said retention sheet when said indicator arm is in said unlocking position, said locking indicator also being arranged on said indicator arm to be uncovered by said retention sheet when said indicator arm is in said locking position;
a first unlocking indicator arranged on said indicator arm to be covered by said retention sheet when said indicator arm is in said locking position, said first unlocking indicator also being arranged on said indicator arm to be uncovered by said retention sheet when said indicator arm is in said unlocking position;
a second unlocking indicator arranged on said retention sheet to be covered by said indicator arm in said locking position of said indicator arm.

* * * * *